United States Patent [19]

Kawabe et al.

[11] 4,128,909
[45] Dec. 12, 1978

[54] ROLLER FOR CLEANING PHONOGRAPH RECORDS

[75] Inventors: Hirokazu Kawabe, Tokyo; Kiyoshi Imai; Masanobu Miyakoshi, both of Annaka, all of Japan

[73] Assignees: Nagaoka Co. Ltd.; Shin-Etsu Chemical Co., Ltd., both of Tokyo, Japan

[21] Appl. No.: 822,276

[22] Filed: Aug. 5, 1977

[30] Foreign Application Priority Data

Aug. 11, 1976 [JP] Japan .......................... 51-107162[U]

[51] Int. Cl.² .......................... C08G 77/04; G11B 3/58
[52] U.S. Cl. .................................. 15/104 A; 15/1.5 A;
15/230.11; 29/132; 528/15; 528/31; 528/32;
528/33; 528/34; 528/38; 528/43; 528/901
[58] Field of Search ............ 15/104 R, 104 A, 256.52;
29/132; 274/47

[56] References Cited

U.S. PATENT DOCUMENTS

| 2,237,638 | 4/1941 | Sinclair | 274/47 X |
| 3,381,325 | 5/1968 | Reineman | 15/185 |
| 3,682,690 | 8/1972 | Amos et al. | 15/104 A X |
| 3,914,817 | 10/1975 | Lindsay | 29/132 X |
| 3,958,292 | 5/1976 | Powell | 15/104 A |

*Primary Examiner*—Daniel Blum
*Attorney, Agent, or Firm*—Toren, McGeady and Stanger

[57] ABSTRACT

The Gramophone record cleaner proposed is of the roller type having a sticky surface formed of a rubbery organopolysiloxane elastomer having a relatively low hardness and adapted to pick up dirt or dust and other contaminants from within the grooves of a record as the roller is passed over the record surface. The roller-type cleaners are superior in their easy performance of complete dirt removal in repeated operations, since the sticky surface of the roller once choked with contaminants can be cleaned simply by rinsing with water.

4 Claims, 6 Drawing Figures

ROLLER FOR CLEANING PHONOGRAPH RECORDS

BACKGROUND OF THE INVENTION

This invention relates to roller-type Gramophone record cleaners having a sticky surface adapted to pick up dirt or dust from inside the grooves provided in the record surface as the roller is passed thereover, and more particularly to such rollers having the sticky layer formed of a certain rubbery organopolysiloxane elastomer.

In order to remove dust, dirt and other contataminants from the surface of a Gramophone record to obtain a good quality of reproduced sounds and a prolonged life of the record, there have been proposed a variety of methods.

One example that is the simplest method is to remove dust and the like by a brush or with an air jet stream ejected from the nozzle of a rubber syringe or the like, or in combination. These methods are naturally ineffective when the dust or dirt to be removed is more or less adhesive to the record surface. Hence, an alternative proposal is to wipe away dust and the like with a wet cloth or cotton gauze. This alternative method may be effective in the removal of contaminants, but is disadvantageous because of the eventual rubbing of the record surface with abrasive contaminants and is inconvenient in having to dry the wet record disk before putting it on the Gramophone.

A further example of commercially available record wipers is something like a blackboard eraser in shape, having a surface covered with a hairy fabric, such as velveteen. This wiper is considerably effective in picking up tiny dust particles from inside the grooves, but is disadvantageous because of the tendency of the picked-up dust particles to accumulate under the wiper in a narrow line, and to be left on the record surface when the wiper is lifted off.

Recently, a roller-type cleaner has been introduced, which is constructed with a roller of plastics or other materials, wound around with multiple turns of a tape with its adhesive surface facing outward, the adhesive-covered roller being rotatably supported on a bracket with a handle attached to the bracket, as disclosed in U.S. Pat. No. 3,958,292. This roller-type cleaner is moved over the surface of a record with its roller rotating around the axis, so that dust or dirt depositing on the record surface is picked up and retained by the surface of the adhesive tape, leaving the record surface free of any contamination. Thus, the cleaning operations are repeated and, when the outermost surface of the adhesive tape has become choked with contaminants, the corresponding layer of tape is peeled off and severed to give a clean adhesive surface for subsequent use.

The above roller-type device may eliminate some disadvantages of the prior art cleaners, but it still has a problem that the end of the peeled and severed tape forms a different level as against the level of the underlying layer, and hence a very local unevenness on the roller surface, resulting in incomplete removal of contaminants from the record surface. Such formation of different levels may be avoided by using a very thin adhesive tape, but the thinner tape has less mechanical strength, making it difficult to peel smoothly. Furthermore, the smaller the diameter of the roller, the more often the replacement of its surface is necessitated, which causes more inconveniences in refilling the roller with a clean covering or re-winding the adhesive tape on the empty roller which is rather laborious. As such, the known roller-type record cleaner has still more problems in practical operations.

SUMMARY OF THE INVENTION

Therefore, the object of the present invention is to provide an improved roller-type Gramophone record cleaner free from the above-described disadvantages and problems encountered in the prior art.

In accordance with the present invention, the proposed roller-type record cleaner is constituted by at least one roller which is rotatably supported by and between a pair of opposed, substantially parallel limbs on a handled bracket, and the roller has an outermost layer made of a rubbery organopolysiloxane elastomer having a hardness not exceeding 40 as determined in accordance with Japanese Industrial Standard, K 6301, and the surface of the layer being adhesive or sticky. The corresponding Shore A hardness is 43.

BRIEF DESCRIPTION OF THE DRAWINGS

The foregoing and other features according to the present invention will be better understood from the following descriptions and the drawings in which.

DETAILED DESCRIPTION OF THE PRERRED EMBODIMENTS

Figure 1:
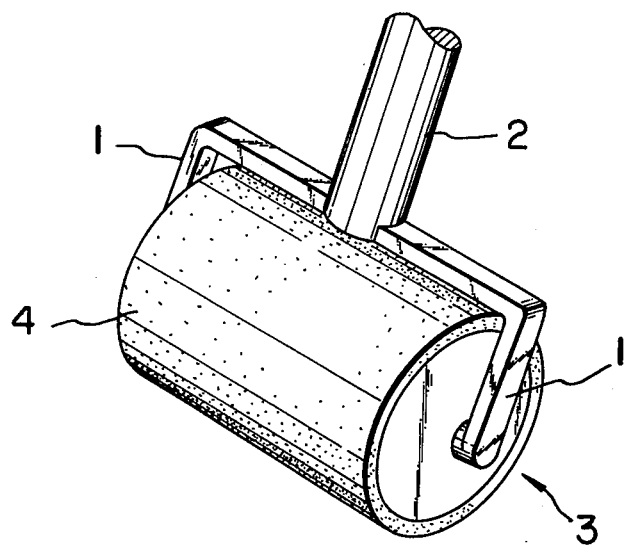
FIG. 1 is a diagrammatic perspective view of a roller-type cleaner in accordance with this invention.
Figure 2:
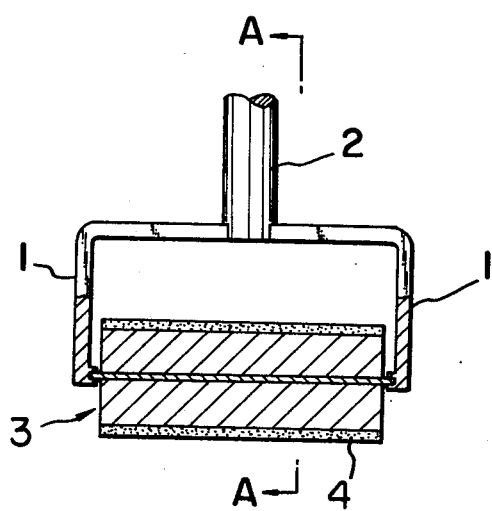
FIG. 2 is a front elevational view in cross section of the cleaner.
Figure 3:
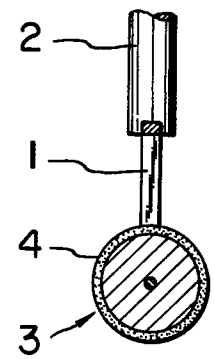
FIG. 3 is a cross-section taken substantially along the line A—A of FIG. 2.
Figure 4:
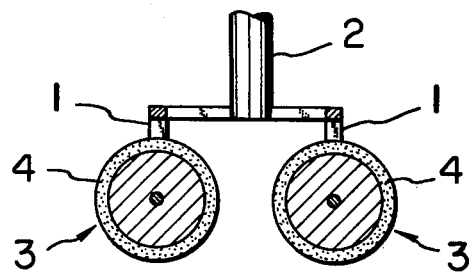
FIG. 4 is a side elevational view in cross section of another embodiment in accordance with this invention, having a pair of rollers.
Figure 5:
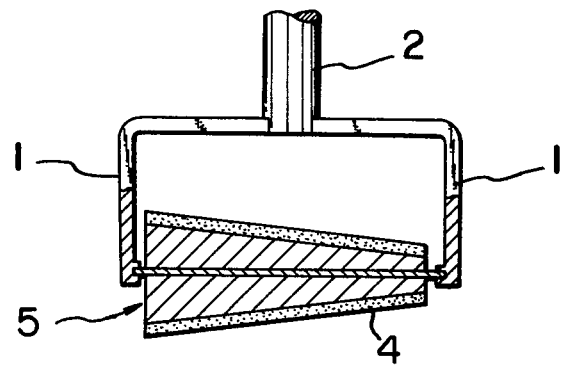
FIG. 5 is a front elevational view in cross section of a further embodiment in accordance with this invention, having a conically shaped roller.
Figure 6:
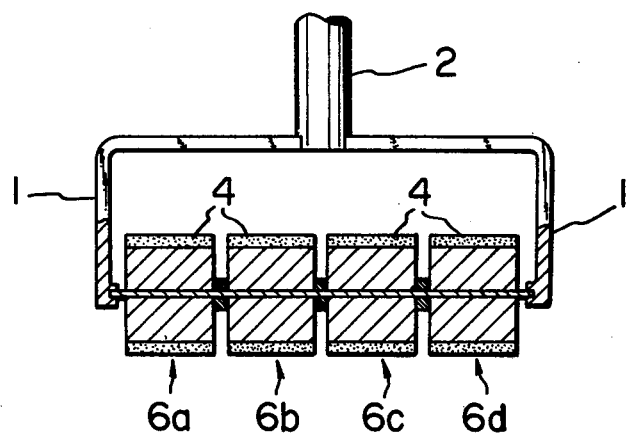
FIG. 6 is a front elevational view in cross section of a still further embodiment in accordance with the invention, having four segments of rollers in an assembly.

Referring now to the drawings, specifically FIG. 1, the Gramophone record cleaner of the present invention comprises a pair of limbs 1, opposed and substantially parallel, forming a bracket to which handle 2 is attached and a roller 3 rotatably engaged with the pair of limbs and peripherically covered with a layer 4. Two or more rollers 3 can be included in the cleaner assembly, two rollers being indicated in FIG. 4. The shape of the roller body is not necessarily cylindrical but could be conical, as shown in FIG. 5. According to a further embodiment of the roller, the roller is divided into a plurality of segment rollers, for example, 6a, 6b, 6c, and 6d as shown in FIG. 6, so that the segment rollers can be rotatable freely and independently from each other.

Roller 3 may be made of unlimited material including plastics, metals, woods, and the like. The body is not necessarily solid but could be hollow, or in the form of sleeve.

The size of roller 3 may be from about 2 to 5 cm in diameter, though not limitative, but to be chosen in consideration of ease in handling and economy in manufacture, with its length being conveniently the same or a little shorter than the grooved width on the Gramophone record.

Layer 4 covering the peripherical surface of roller 3 is formed of a rubbery organopolysiloxane elastomer. Its physical properties are the most critical factor to give high efficiency in the removal of dust or dirt and other contaminants from the surface of the Gramophone record. The hardness of the rubbery elastomer must not exceed 40 or, preferably, below 10, as determined in accordance with Japanese Industrial Standard, K 6301. The corresponding shore A hardness for JIS, K 6301, 10 and 40 is 11 and 43, respectively. When the rubbery organopolysiloxane elastomer has a hardness value higher than 40, the surface can hardly be pressed into the grooves of the record by a gentle force, with no satisfactory picking up of fine dust particles from the bottom of each groove. On the other hand, when the hardness of the organopolysiloxane elastomer is too low, it proves to have an insufficient mechanical strength for the purpose.

The thickness of surface layer 4 may be thin enough to be forced into the individual grooves to sufficient depths by a gentle pressing action so that contaminant particles in the groove bottom may be picked up by virtue of the sticky characteristic of the material. It is recommended that the thickness of the rubber layer be larger than about 1 mm or, preferably, larger than about 2 mm from the standpoint of ease in fabrication, though no specific advantages can be obtained with a thickness larger than about 5 mm.

As has been suggested already, the surface of the rubbery organopolysiloxane elastomer forming the outermost layer 4 must be adhesive or sticky, since the removal of dust from the record surface depends largely on the sticking of the dust particles to the same surface. Therefore, insufficient stickiness would result in incomplete removal of the dust, whereas excessive stickiness would bring about some inconvenience in operation due to the increased resistance met in the rotation of the roller on the record surface, even though there is an improved removal of dust. Thus, the stickiness of the surface of the rubbery layer is preferably in the range from 4 to 30 as determined in accordance with J. Dow's rolling ball stick test.

It is advantageous that the rubbery organopolysiloxane elastomer forming surface layer 4 has a compressive stress in the range from 0.05 to 8 or, preferably, from 0.1 to 5 kg/cm$^2$ at 25% compression.

The rubbery organopolysiloxane elastomers useful for the formation of the outer surface of the roller in accordance with the present invention are advantageous because of its availability to satisfy the requirements, i.e., hardness, stickiness, and compression stress as mentioned above. In addition, the hydrophobic properties of the material offer an advantage that the contaminant particles picked up and retained by the surface of the elastomer layer can be easily washed away by simply rinsing with water, if necessary, together with dissolved detergents, leaving a clean surface free of any water droplets, and ready for subsequent use.

In the following, the formulation of the organopolysiloxane elastomers suitable for use in the formation of the surface layer of the roller in the present invention will be described.

As is well known in the silicone technology, an organopolysiloxane rubber is formulated with a diorganopolysiloxane, a crosslinking agent optionally with addition of a crosslinking catalyst, and a filler. Also, several types of mechanisms are known in the crosslinking reaction of the organopolysiloxane rubbers, among which the most widely employed are the so-called addition-type crosslinking reaction, condensation-type crossslinking reaction, and crosslinking by organic peroxides. For example, a vinyl-containing diorganopolysiloxane can be crosslinked with an organopolysiloxane having hydrogen atoms bonded directly to the silicon atoms as a crosslinking agent in the presence of a platinum compound as a catalyst by additional reaction between the vinyl groups and the silicon-bonded hydrogen atoms. Alternatively, a diorganopolysiloxane terminated with hydroxy groups at both chain ends can be crosslinked by condensation reaction with a silane or a siloxane having hydrolyzable functional groups in an amount exceeding 2 per molecule as a crosslinking agent with or without the addition of a curing catalyst, such as organic acid salt of metals.

Contrary to the conventionally established practice in the formulation of an organopolysiloxane rubber in which an excessive amount of the crosslinking agent is used in order to utilize all of the crosslinkable functional groups present in the diorganopolysiloxane to give the highest possible crosslinking density, the organopolysiloxane rubbers suitable for use in the present invention must be formulated with a much smaller amount of a crosslinking agent in order to attain the satisfactory degree of stickiness and hardness, though the optimum amount of the crosslinking agent depends largely on the type of the crosslinking reaction and too small amounts would result in the formation of a gelled, non-elastomeric mass.

In the above addition-type organopolysiloxane rubbers it is recommended that from 0.01 to 1.0 or, preferably, from 0.3 to 0.8 of silicon-bonded hydrogen atoms in the crosslinking agent is provided per vinyl group in the diorganopolysiloxane, whereas the ratio is at least 1.2 in the conventional organopolysiloxane rubbers.

In the condensation-type organopolysiloxane rubbers, on the other side, the hydrolyzable functional groups in the crosslinking agent are provided in an amount from 0.5 to 1.5 moles per mole of the terminal hydroxy groups in the diorganopolysiloxane, whereas the ratio is at least 2 in the conventional organopolysiloxane rubbers.

The recommended formulation of each of the addition-type and condensation-type organopolysiloxane rubbers is given below.

The addition-type organopolysiloxane rubber has a formulation comprising:
(a) a diorganopolysiloxane with a viscosity in the range from 100 to 500,000 centistokes at 25° C. represented by the general formula

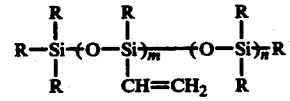

where R is a monovalent hydrocarbon group free of aliphatic unsaturation, such as methyl and phenyl groups and m and n are each positive integers with the proviso that m/(m+n) is between 0.001 and 0.1,
(b) an organopolysiloxane with a viscosity not exceeding 10,000 centistokes at 25° C., having 1.5 to 3 hydrogen atoms bonded directly to the silicon atoms per molecule, in an amount such that from 0.01 to 1.0 of the hydrogen atoms bonded directly to the silicon atoms are provided per vinyl group in component (a), (c) a catalytic amount of a platinum compound, and
(d) optionally, a filler in an amount less than 200 parts by weight based on 100 parts by weight of component (a).

The condensation-type organopolysiloxane rubber has a formulation comprising:
(e) a diorganopolysiloxane with a viscosity in the range from 100 to 500,000 centistokes at 25° C. represented by the general formula

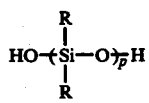

where R is a monovalent hydrocarbon group, such as methyl and phenyl groups and p is a positive integer,
(f) an organosilane or an organopolysiloxane having 2 to 4 hydrolyzable groups, such as alkoxy, acyloxy, aminoxy, amino, amido and oxime groups, per molecule in an amount such that from 0.5 to 1.5 of the hydrolyzable groups are provided per hydroxy group in component (e),
(g) optionally, a metal salt of an organic acid in an amount less than 5 parts by weight based on 100 parts by weight of component (e), and
(h) optionally, a filler in an amount less than 200 parts by weight based on 100 parts by weight of component (e).

The roller-type Gramophone record cleaner of the invention as shown, for example, in FIG. 1 is put to use by placing roller 3 with its axis generally radially of the record to meet generally at right angles with the grooves and gently pressing it to the record surface while rotating. The relative movements taking place between the rotating record and the rolling roller always produce a force of sliding friction due to difference in the peripheral velocities of the record at the radially outer and inner regions of the record. Needless to say, it is desirable to reduce the sliding friction to a level as low as possible so that perfect rolling friction is produced. As a means for the purpose, the conical roller 5 as shown in FIG. 5, is proposed. The conical roller cleaner is used in a manner such that the broader end of the roller is positioned at the outer periphery of the record while the thinner end of the side of the record label.

Alternatively, a cylindrical roller is divided into a plurality of segment rollers, for example, as shown in FIG. 6, each of the segment rollers being rotatable freely and independently from each other so that the segment rollers at the outer periphery of the record rotates more rapidly than the others at the inner position, causing less sliding friction.

When the record cleaner of the present invention is accommodated with two or more rollers, it is convenient to have one of the rollers covered with hairy fabrics like velveteen instead of the rubbery elastomer and arranged to go in front of other rubbery elastomer-covered roller or rollers. This roller system results in an advantage that dust particles are first wiped up by the tips of hairy filaments from the very bottom of the grooves to the surface of the record from where those dust particles are picked up for retention by the sticky surfaces of the rear roller or rollers, thus realizing a combination of a wiping means by the fabric-covered front roller and a picking-up means by the sticky rubber-surfaced roller. In this case, the fabric-covered roller may not have a free rotation around its axis, but may be fixedly mounted on the bracket limbs. It is possible of course that the fabric-covered roller is flat-bottomed instead of cylindrical.

Further, the record cleaner of the present invention can be accommodated with an electrostatic discharger. The electrostatic discharger mounted on the same bracket runs after the roller to eliminate electrostatic charge generated by the sliding friction between the surfaces of the moving roller and the record. The electrostatic discharger itself may be a cylindrical roller having its surface layer formed of an electroconductive rubbery material, such as a silicone rubber, impregnated with an electroconductive filler, such as metal powder or carbon black. Alternatively, the electrostatic discharger may be a sort of wiper formed of a spongy material, such as foamed plastics, and soaked with a charge-eliminating liquid, such as a solution of surface active agents.

As has been explained above, the roller-type Gramophone record cleaner in accordance with the present invention is very superior in practical performance of completely removing dust or dirt and other contaminants deposited in the record grooves, and it is advantageous due to the ease of its use and long life, since the roller surfaces can be cleaned of the contaminants retained thereon by simply rinsing with water.

The following examples illustrate the preparation of the organopolysiloxane compositions useful for the covering layer of the rollers to be mounted on the record cleaners of the present invention and the manufacture of such rollers. In the examples, the values of hardness and stickiness with respect to the organopolysiloxane compositions were determined in accordance with Japanese Industrial Standard, K 6301 and J. Dow's rolling ball stick test, respectively.

EXAMPLE 1

An organopolysiloxane rubber composition was prepared by uniformly blending 100 parts by weight of a diorganopolysiloxane with a viscosity of 1,000 centistokes at 25° C. composed of 1 mole % of methylvinylsiloxane units and 99 mole % of dimethylsiloxane units having trimethylsilyl groups as the terminal groups, 10 parts by weight of an organopolysiloxane with a viscosity of 18 centistokes at 25° C. containing 2-methylhydrogensiloxane units in a molecule, the rest being dimethylsiloxane units, and 0.02 part by weight of an isopropyl alcohol solution of chloroplatinic acid in a concentration of 5% by weight of platinum.

The above composition was poured into a cylindrical metal mold 32 m in inner diameter and 100 mm deep, inside which an aluminum core 28 mm in diameter had been set standing at the center.

The composition in the metal mold was heated at 120° C. for 30 minutes, and then taken out together with the aluminum core, followed by subsequent post-curing at 150° C. for 1 hour to form a finished rubber-clad roller.

The organopolysiloxane composition thus cured was found to have the following properties.
Hardness (JIS K 6301) — 2
(Corresponding Shore A) — (2)
Stickiness — 20
Compressive stress at 25% compression — 1.0 kg/cm$^2$

EXAMPLE 2

An organopolysiloxane composition was prepared by uniformly blending 100 parts by weight of a diorganopolysiloxane with a viscosity of 700 centistokes at 25° C. composed of 5 mole % of methylvinylsiloxane units and 95 mole % of dimethylsiloxane units having trimethylsilyl groups as the terminal groups, 7 parts by weight of a dimethylpolysiloxane with a viscosity of 12 centistokes at 25° C. with dimethylhydrogensilyl groups as the terminal groups, 0.14 part by weight of an isopropyl alcohol solution of chloroplatinic acid in a concentration of 5% by weight as platinum, and 45 parts by weight of a fine quartz powder having an average particle size of about 5 μm.

Using the above composition, an aluminum-cored and rubber-clad roller was manufactured in the same manner as in Example 1.

The organopolysiloxane composition thus cured was found to have the following properties.

Hardness (JIS K 6301) — lower than 1
(Corresponding Shore A) — (lower than 1)
Stickiness — 26
Compressive stress at 25% compression — 0.6 kg/cm$^2$

EXAMPLE 3

An organopolysiloxane composition was prepared by uniformly blending 100 parts by weight of a dimethylpolysiloxane with a viscosity of 5,000 centistokes at 25° C. terminated at both chain ends with hydroxy groups, 0.5 part by weight of n-propyl orthosilicate, 0.5 part by weight of dibutyltin dilaurate, and 70 parts by weight of a fine quartz powder having an average particle diameter of about 5 μm.

Using the above composition, an aluminum-cored and rubber-clad roller was manufactured in the same manner as in Example 1 except the first curing was effected in the metal mold at 25° C. for 24 hours and the post-curing at 100° C. for 1 hour.

The organopolysiloxane composition thus cured was found to have the following properties.

Hardness JIS K 6301) — 30
(Corresponding Shore A) — (32)
Stickiness — 8
Compressive stress at 25% compression — 2.8 kg/cm$^2$

EXAMPLE 4

An organopolysiloxane composition was prepared by uniformly blending 65 parts by weight of a dimethylpolysiloxane with a viscosity of 20,000 centistokes at 25° C. terminated at both chain ends with hydroxy groups, 35 parts by weight of a trimethylsilyl-terminated dimethylpolysiloxane with a viscosity of 100 centistokes at 25° C., 2.5 parts by weight of dimethyldiacetoxysilane, 2.5 parts by weight of methyltriacetoxysilane, and 100 parts by weight of a fumed silica filler having a specific surface area of 130 m$^2$/g treated with trimethylchlorosilane.

Using the above composition, an aluminum-cored and rubber-clad roller was manufactured in the same manner as in Example 3.

The organopolysiloxane composition thus cured was found to have the following properties.

Hardness JIS K 6301) — 20
(Corresponding Shore A) — (22)
Stickiness — 12
Compressive stress at 25% compression — 2.1 kg/cm$^2$

What is claimed is:

1. An improved Gramophone record cleaner of the roller type wherein at least one roller is rotatably supported by and between a pair of opposed, substantially parallel limbs on a handled bracket, the improvement comprising the roller having an outermost layer made of a rubbery organopolysiloxane elastomer having hardness not exceeding 40 as determined in accordance with Japanese Industrial Standard K 6301, the surface of the layer being sticky, the stickiness of the surface of the layer is in the range of 4 to 30 as determined by J. Dow's rolling ball stick test, and said rubbery organopolysiloxane elastomer has a formulation comprising:

(a) a diorganopolysiloxane with a viscosity in the range from 100 to 500,000 centistokes at 25° C. represented by the general formula

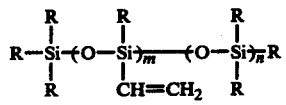

where R is a monovalent hydrocarbon group free of aliphatic unsaturation, such as methyl and phenyl groups and m and n are each positive integers with the proviso that m/(m+n) is between 0.001 and 0.1, (b) an organopolysiloxane with a viscosity not exceeding 10,000 centistokes at 25° C., having 1.5 to 3 hydrogen atoms bonded directly to the silicon atoms per molecule, in an amount such that from 0.01 to 1.0 of the hydrogen atoms bonded directly to the silicon atoms are provided per vinyl group in component (a), and (c) a catalytic amount of a platinum compound.

2. The roller-type cleaner as claimed in claim 1 wherein said outermost layer has a thickness in the range from 1 mm to 5 mm.

3. The roller-type cleaner as claimed in claim 1 wherein said rubbery organopolysiloxane elastomer has a compressive stress in the range from 0.05 to 8 kg/cm$^2$ at 25% compression.

4. In an improved Gramophone record cleaner of the roller type wherein at least one roller is rotatably supported by and between a pair of opposed, substantially parallel limbs on a handled bracket, the improvement comprising the roller having an outermost layer made of a rubbery organopolysiloxane elastomer having hardness not exceeding 40 as determined in accordance with Japanese Industrial Standard, K 6301, the surface of the layer being sticky, the stickiness of the surface of the layer is in the range of 4 to 30 as determined by J. Dow's rolling ball stick test, and said rubbery organopolysiloxane elastomer has a formulation comprising:

(a) a diorganopolysiloxane with a viscosity in the range from 100 to 500,000 centistokes at 25° C. represented by the general formula

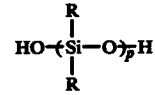

where R is a monovalent hydrocarbon group, such as methyl and phenyl groups and p is a positive integer, and (b) an organosilane or an organopolysilozane having 2 to 4 hydrolyzable groups, such as alkoxy, acyloxy, aminoxy, amino, amido and oxime groups, per molecule in an account such that from 0.5 to 1.5 of the hydrolyzable groups are provided per hydroxy group in component (a).

* * * * *